US012611959B2

(12) United States Patent
Shin

(10) Patent No.: US 12,611,959 B2
(45) Date of Patent: Apr. 28, 2026

(54) VEHICLE CHARGING SYSTEM AND CHARGING CONTROL METHOD THEREFOR

(71) Applicants: Hyundai Motor Company, Seoul (KR); Kia Corporation, Seoul (KR)

(72) Inventor: Yong Woo Shin, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 953 days.

(21) Appl. No.: 17/868,036

(22) Filed: Jul. 19, 2022

(65) Prior Publication Data

US 2023/0013002 A1    Jan. 19, 2023

(30) Foreign Application Priority Data

Jul. 19, 2021    (KR) ........................ 10-2021-0094138

(51) Int. Cl.
*B60L 53/66* (2019.01)
*B60L 53/16* (2019.01)
*B60L 53/65* (2019.01)

(52) U.S. Cl.
CPC ............. *B60L 53/665* (2019.02); *B60L 53/16* (2019.02); *B60L 53/65* (2019.02)

(58) Field of Classification Search
CPC ......... B60L 53/665; B60L 53/16; B60L 53/65
USPC ........................................................ 320/109
See application file for complete search history.

(56) References Cited

U.S. PATENT DOCUMENTS

| | | | | | |
|---|---|---|---|---|---|
| 5,462,439 | A | * | 10/1995 | Keith ........................ | B60L 1/12 439/246 |
| 8,025,526 | B1 | * | 9/2011 | Tormey .............. | H01R 13/6397 439/372 |
| 8,350,525 | B2 | * | 1/2013 | Handler .................. | B60L 53/52 320/109 |
| 8,354,913 | B2 | * | 1/2013 | Solomon ................. | G06F 21/31 320/108 |
| 8,460,028 | B2 | * | 6/2013 | Tormey .............. | H01R 13/6397 439/528 |
| 8,521,599 | B2 | * | 8/2013 | Rivers, Jr. ............... | B60L 53/63 705/16 |
| 11,648,846 | B2 | * | 5/2023 | Sun ..................... | G06Q 30/0284 320/109 |
| 11,660,974 | B2 | * | 5/2023 | Wang .................... | B60L 53/305 320/109 |
| 11,673,483 | B2 | * | 6/2023 | Sun .......................... | B60L 53/51 320/109 |
| 11,724,607 | B2 | * | 8/2023 | Kirschner ............... | B60L 53/18 320/109 |
| 11,724,616 | B2 | * | 8/2023 | Sun ........................ | G07F 15/005 320/109 |

(Continued)

FOREIGN PATENT DOCUMENTS

| | | | | | | |
|---|---|---|---|---|---|---|
| CN | | 115489392 | A | * | 12/2022 | ............. B62D 25/24 |
| CN | | 115788215 | A | * | 3/2023 | ............. B60L 53/14 |

*Primary Examiner* — Suresh Memula

(74) *Attorney, Agent, or Firm* — Slater Matsil, LLP

(57) ABSTRACT

An embodiment charging control method of an electric vehicle includes receiving, by a head unit of the electric vehicle, input of order information for a charging station, requesting payment based on the order information, and opening a charging port door when charging approval information is received in response to order identification information corresponding to the order information being input to a charger provided in the charging station.

20 Claims, 2 Drawing Sheets

100

(56) References Cited

U.S. PATENT DOCUMENTS

| | | | |
|---|---|---|---|
| 11,724,617 B2 * | 8/2023 | Sun | B60L 53/63 |
| | | | 320/109 |
| 11,727,106 B2 * | 8/2023 | Shin | B60L 53/66 |
| | | | 713/168 |
| 11,748,788 B2 * | 9/2023 | Khoo | G06Q 10/02 |
| | | | 700/286 |
| 2010/0156349 A1 * | 6/2010 | Littrell | B60L 53/305 |
| | | | 320/109 |
| 2012/0306443 A1 * | 12/2012 | Smith | H02J 7/00 |
| | | | 320/109 |
| 2014/0249976 A1 * | 9/2014 | Sugimura | G06Q 50/06 |
| | | | 320/109 |
| 2021/0090141 A1 * | 3/2021 | Khoo | H04L 63/10 |
| 2023/0122010 A1 * | 4/2023 | Qiao | B60L 53/65 |
| | | | 320/109 |
| 2023/0202339 A1 * | 6/2023 | Logvinov | B60L 53/68 |
| | | | 320/109 |
| 2024/0198827 A1 * | 6/2024 | Vicari | B60L 53/30 |

* cited by examiner

Figure 2:
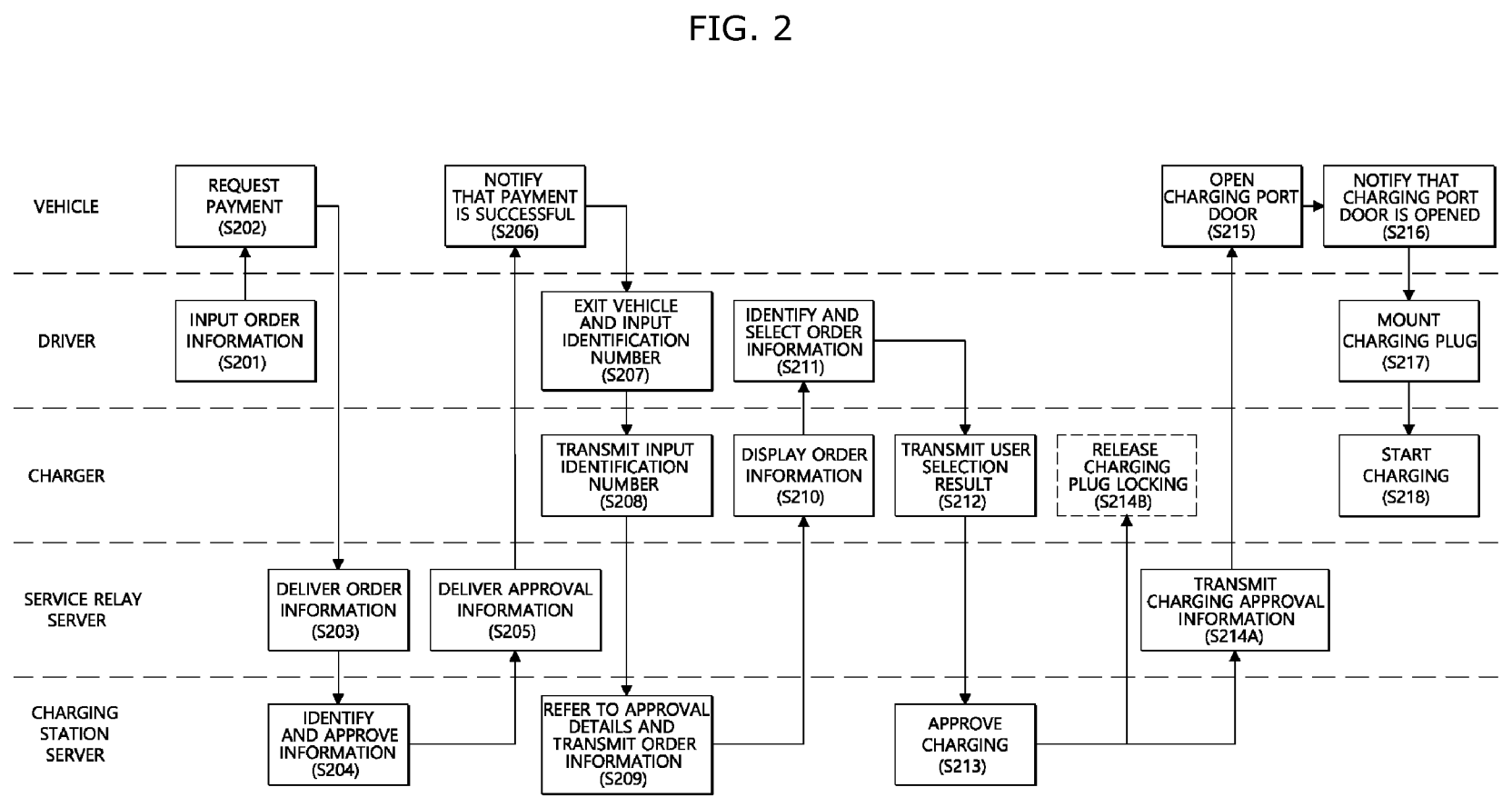

VEHICLE

DRIVER

CHARGER

SERVICE RELAY SERVER

CHARGING STATION SERVER

INPUT ORDER INFORMATION (S201)

REQUEST PAYMENT (S202)

DELIVER ORDER INFORMATION (S203)

IDENTIFY AND APPROVE INFORMATION (S204)

DELIVER APPROVAL INFORMATION (S205)

NOTIFY THAT PAYMENT IS SUCCESSFUL (S206)

EXIT VEHICLE AND INPUT IDENTIFICATION NUMBER (S207)

TRANSMIT INPUT IDENTIFICATION NUMBER (S208)

REFER TO APPROVAL DETAILS AND TRANSMIT ORDER INFORMATION (S209)

DISPLAY ORDER INFORMATION (S210)

IDENTIFY AND SELECT ORDER INFORMATION (S211)

TRANSMIT USER SELECTION RESULT (S212)

APPROVE CHARGING (S213)

RELEASE CHARGING PLUG LOCKING (S214B)

TRANSMIT CHARGING APPROVAL INFORMATION (S214A)

OPEN CHARGING PORT DOOR (S215)

NOTIFY THAT CHARGING PORT DOOR IS OPENED (S216)

MOUNT CHARGING PLUG (S217)

START CHARGING (S218)

VEHICLE CHARGING SYSTEM AND CHARGING CONTROL METHOD THEREFOR

CROSS-REFERENCE TO RELATED APPLICATIONS

This application claims the benefit of Korean Patent Application No. 10-2021-0094138, filed on Jul. 19, 2021, which application is hereby incorporated herein by reference.

TECHNICAL FIELD

The present invention relates to a vehicle charging system and a charging control method therefor.

BACKGROUND

In-vehicle payment technology provides a simple payment function for refueling, parking, drive-through services, etc. in a vehicle through payment information of a driver registered in advance. In this way, a user may use services without getting out of a vehicle or does not have to prepare a separate payment method (credit card, cash, etc.), which increases convenience.

Recently, the number of electric vehicles, each of which may charge a battery by mounting a charging plug of an external charger to a vehicle charging port, has been increasing. Thus, similarly to a scheme in which an internal combustion engine vehicle uses a gas station, in-vehicle payment technology is applicable to charging stations for electric vehicles.

In particular, in the case of an electric vehicle, by applying an actuator such as a motor to a charging port door for connecting a charging plug, it is possible to control opening and closing of the charging port door through voice recognition or remote control as well as operation of a charging port door open button. Thus, for more convenient charging, linking with in-vehicle payment technology may be considered.

SUMMARY

The present invention relates to a vehicle charging system and a charging control method therefor. Particular embodiments relate to a vehicle charging system capable of controlling opening and closing of a charging port door of an electric vehicle based on advance payment in charging of the electric vehicle, and a charging control method therefor.

Accordingly, embodiments of the present invention provide a vehicle charging system and a charging control method therefor that substantially obviate one or more problems due to limitations and disadvantages of the related art.

An embodiment of the present invention provides a vehicle charging system capable of controlling a charging port door by determining a charging intention of a driver based on in-vehicle payment information, and a charging control method therefor.

Additional advantages, objects, and features of embodiments of the invention will be set forth in part in the description which follows and in part will become apparent to those having ordinary skill in the art upon examination of the following or may be learned from practice of the invention. The objectives and other advantages of embodiments of the invention may be realized and attained by the structure particularly pointed out in the written description and claims hereof as well as the appended drawings.

A charging control method of an electric vehicle according to embodiments of the invention includes receiving, by a head unit of the electric vehicle, input of order information for a charging station, requesting payment based on the order information, and opening a charging port door when charging approval information is received in response to order identification information corresponding to the order information being input to a charger provided in the charging station.

The requested payment may be transmitted to a charging station server communicating with the charger through a service relay server, and the charging approval information may be delivered from the charging station server to the head unit of the electric vehicle through the service relay server.

The order identification information may include first information for identifying the electric vehicle or a user of the electric vehicle or second information generated based on the order information.

The first information may include at least one of a vehicle number of the electric vehicle or a user ID, and the second information may include at least one of a payment number, a receipt number, or a one-time identification number.

The opening may include controlling an actuator for opening and closing the charging port door.

In another embodiment of the present invention, a control method of a charging station server for charging an electric vehicle includes identifying, by the charging station server, approval information corresponding to order identification information when the order identification information is delivered from a charger of a charging station to the charging station server, delivering order information corresponding to the identified approval information to the charger, and transmitting a signal instructing that a charging port door be opened to a head unit of an electric vehicle corresponding to the order identification information when there is a charging request from the charger.

The signal instructing that the charging port door be opened may be transmitted to the head unit of the electric vehicle through a service relay server.

The order identification information may include first information for identifying the electric vehicle or a user of the electric vehicle or second information generated based on the order information.

The first information may include at least one of a vehicle number of the electric vehicle or a user ID, and the second information may include at least one of a payment number, a receipt number, or a one-time identification number.

In another embodiment of the present invention, an electric vehicle includes a head unit and a charging port door allowed to be controlled to be opened or closed under control of the head unit, in which the head unit requests payment based on order information for a charging station when the order information is received and performs a control operation to open the charging port door when charging approval information is received in response to input of order identification information corresponding to the order information to a charger provided in the charging station.

In another embodiment of the present invention, a charging control method for an electric vehicle includes receiving, by the electric vehicle, input of order information for a charging station, receiving the order information by a charging station server corresponding to the charging station, generating, by the charging station server, approval information based on the order information, delivering the approval information to the electric vehicle, inputting order identification information corresponding to the order information to a charger provided in the charging station, identifying, by the charging station server, the approval information corresponding to the order identification information when the order identification information is delivered to the charging station server, delivering charging approval information from the charging station server to the electric vehicle when there is a charging request from the charger, and opening a charging port door of the electric vehicle in response to the charging approval information.

The method may further include delivering the order information from the charging station server to the charger when the approval information is identified and displaying at least a part of the order information on the charger.

The method may further include delivering the charging request to the charging station server when the order information is selected by a user in the charger.

The method may further include requesting, by the charging station server, the charger to release charging plug locking when there is a charging request from the charger.

The order identification information may include first information for identifying the electric vehicle or a user of the electric vehicle or second information generated based on the order information.

The first information may include at least one of a vehicle number of the electric vehicle or a user ID, and the second information may include at least one of a payment number, a receipt number, or a one-time identification number.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate exemplary embodiments of the invention and together with the description serve to explain the principle of the invention. In the drawings:

FIG. 2 is a flowchart illustrating an example of a charging control process according to an embodiment of the present invention.

DETAILED DESCRIPTION OF ILLUSTRATIVE EMBODIMENTS

Figure 1:
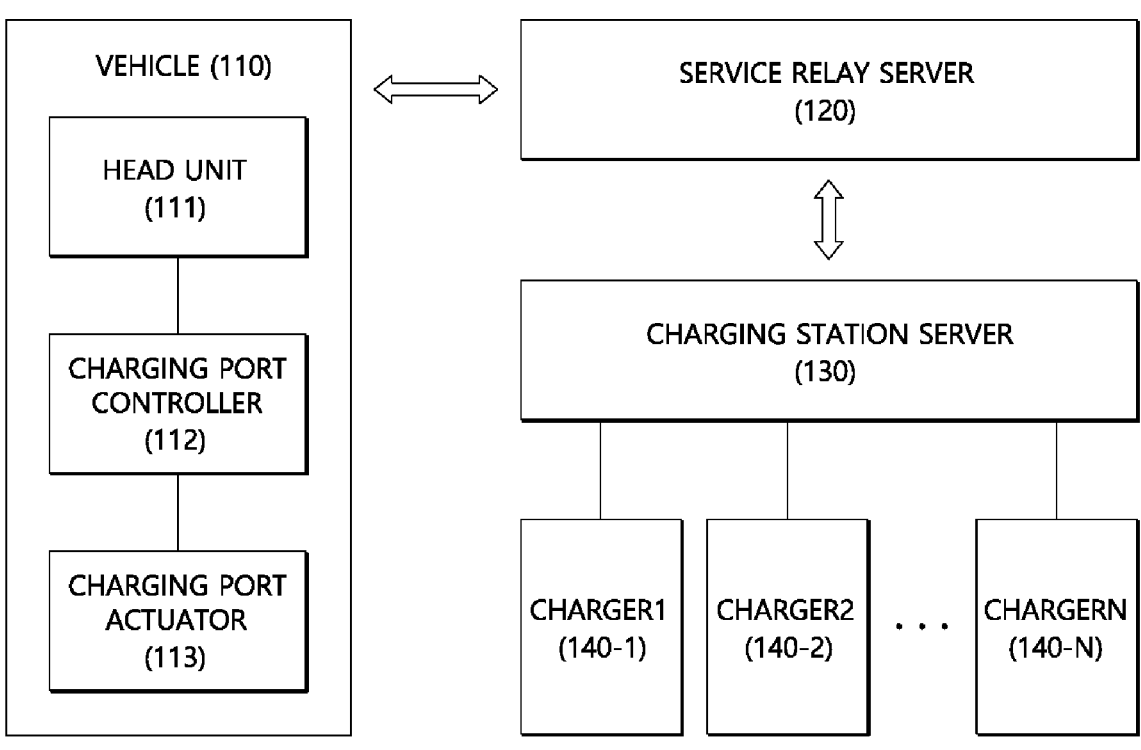
FIG. 1 illustrates an example of a configuration of a vehicle charging system applicable to embodiments of the present invention.

Hereinafter, embodiments disclosed in this specification will be described in detail with reference to the accompanying drawings, and the same or similar elements will be given the same reference symbols and redundant description thereof will be omitted. In the following description, the terms "module" and "unit" for referring to elements are assigned and used interchangeably in consideration of convenience of explanation, and thus, the terms per se do not necessarily have different meanings or functions. Further, in describing the embodiments disclosed in the present specification, when it is determined that a detailed description of a related publicly known technology may obscure the gist of the embodiments disclosed in the present specification, the detailed description thereof will be omitted. In addition, the accompanying drawings are used to help easily understand the embodiments disclosed in this specification, the technical idea disclosed in this specification is not limited by the accompanying drawings, and it should be understood that all alterations, equivalents, and substitutes included in the spirit and scope of the present invention are not excluded.

Although terms including ordinal numbers, that is, "first", "second", etc. may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Embodiments of the present invention provide that, in an electric vehicle that can be charged with external power, the charging amount is paid through in-vehicle payment, and when identification information is input to a charger, a predetermined signal is transmitted to the vehicle to automatically open a charging port door.

First, a system configuration applicable to the embodiments will be described.

FIG. 1 illustrates an example of a configuration of a vehicle charging system applicable to embodiments of the present invention.

Referring to FIG. 1, a vehicle charging system 100 may include a vehicle 110, a service relay server 120, a charging station server 130, and one or more chargers 140-1, 140-2, . . . 140-N.

The vehicle 110 is preferably an electric vehicle that can be charged through external power. Examples of such an electric vehicle may include, but are not limited to, a plug-in hybrid electric vehicle (PHEV), an electric vehicle (EV), etc. In addition, the vehicle 110 may include a head unit 111, a charging port controller 112, and a charging port actuator 113.

The head unit 111 may have a communication function, an input/output function, an in-vehicle payment function, and a charging port opening/closing control function.

For example, the communication function of the head unit 111 may include an internal communication function for communicating with an internal device of the vehicle including the charging port controller 112 and an external communication function for communicating with an external entity such as the service relay server 120. For the internal communication function, the head unit 111 may include a transceiver corresponding to at least one of vehicle communication protocols such as controller area network (CAN), CAN-flexible data rate (FD), local interconnect network (LIN), Ethernet, etc. In addition, for the external communication function, the head unit 111 may include a modem corresponding to at least one wireless communication protocol such as 3GPP-based (3G/LTE/5G, etc.) or GSM.

In addition, for the input/output function, the head unit 111 may include an input device such as a key button, a dial, a microphone (or a microphone signal input terminal), a touch detection device, etc. for receiving a command from a user, and an output device such as a display (or a touch screen), a speaker (or a speaker output terminal), etc.

For example, the head unit 111 may be implemented in the form of an Audio/Video/Navigation (AVN) system. However, the present invention is not limited thereto. The external communication function may be implemented as a separate controller such as a telematics unit (TMU).

In addition, the head unit 111 may be implemented as at least one processor, a memory, and a transceiver/modem. In this case, the head unit 111 may be implemented in the form of storing a set of instructions executed through the processor in the memory to perform the in-vehicle payment function and the charging port opening/closing control function.

The charging port controller 112 may operate the charging port actuator 113 according to a control signal of the head unit 111 to open or close the charging port door and may monitor an operating state of the charging port actuator 113 to report a control result according to the control signal or a state of the charging port door to the head unit 111. In an implementation, the charging port controller 112 may be integrated with the charging port actuator 113 and may be omitted when the head unit 111 can directly control the charging port actuator. Alternatively, the charging port controller 112 may be implemented as a function of a charging controller (for example, on-board charger (OBC), not illustrated) that controls a charging process of a battery (not illustrated) using external power.

The service relay server 120 may serve to relay data exchange between the head unit 111 of the vehicle 110 and the charging station server 130, and according to an embodiment, when there is a payment request including order information from the head unit 111 of the vehicle 110, payment processing may be performed based on the order information to generate payment approval information. For example, the service relay server 120 may be implemented as a telematics service server or may communicate with the head unit 111 via the telematics service server.

When the service relay server 120 receives the order information input through the head unit 111, the charging station server 130 performs payment processing based on the received order information (for example, an attempt to make a payment to a separate financial company payment server, etc.). When payment processing is successful, approval information may be delivered to the head unit 111 through the service relay server 120. In addition, when a driver inputs order identification information to any one of the one or more chargers 140-1, 140-2, . . . 140-N, the charging station server 130 may receive the order identification information from the charger and deliver approved order-related information such as the charging amount corresponding to the order identification information or the payment approval amount. Here, the order identification information may be a number for identifying a vehicle or driver, such as a vehicle number (license plate), chassis number, or driver information (in-vehicle payment service ID, etc.), or information to be used for a charging procedure, such as a payment number (transaction number), a payment receipt number, or a one-time authentication code that is valid for a limited time. However, the present invention is not limited thereto. In this way, when the user determines to perform charging in the charger, the charging station server 130 may deliver charging approval information to the charger and the head unit 111.

Each of the one or more chargers 140-1, 140-2, . . . 140-N includes a charging plug and a power supply, and preferably includes an input means for the driver to input the order identification information and a display means capable of displaying the order-related information. In addition, each of the chargers may include a charging plug locking device capable of physically fixing the charging plug in a locked state and releasing the locked state according to the charging approval information of the charging station server 130.

The charging station server 130 and the one or more chargers 140-1, 140-2, . . . 140-N may be located at the same location, for example, in a single charging station, and do not have to be disposed in the same location as long as data communication is possible.

With regard to respective elements of the vehicle charging system 100 illustrated in FIG. 1, elements related to the embodiments of the present invention are mainly illustrated, and thus the actual system may have more or fewer elements.

As an example, the service relay server 120 may be divided into a telematics service server in charge of a relay function and a payment server for performing payment and generating approval history information. As another example, it is apparent to those skilled in the art that the vehicle 110 further includes elements such as a battery for storing power supplied from the charger by mounting the charging plug and a driving motor supplied with power from the battery, and the vehicle 110 may further include a steering system essential for basic driving, a braking system, safety equipment such as an airbag, various convenience equipment, etc.

FIG. 2 is a flowchart illustrating an example of a charging control process according to an embodiment of the present invention.

Referring to FIG. 2, the driver may input order information through the head unit 111 of the vehicle 110 (S201). The order information may include at least one piece of information such as order identification information, the charging amount, the payment amount, a payment method, or a charging station desired to be used. However, the present invention is not limited thereto.

Accordingly, the head unit 111 of the vehicle 110 requests that the service relay server 120 perform payment based on the input order information (S202), and the service relay server 120 delivers the order information to the charging station server 130 (S203). To this end, the service relay server 120 may identify the charging station server 130 based on information about the charging station desiring to use the order information.

The charging station server 130 identifies the delivered order information, and approves payment processing based thereon (S204). In this step, when order identification information (for example, user ID, vehicle number, etc.) is present in the order information, the charging station server 130 may identify the information, and when the order identification information is not present, the charging station server 130 may include order identification information (for example, a payment receipt number, a one-time authentication code that is valid for a limited time, etc.) in payment approval information. In addition, the charging station server 130 may store the approval information, order information, and order identification number in conjunction with each other.

The payment approval information may be delivered from the charging station server 130 to the vehicle through the service relay server (S205). Here, the payment approval information may include the above-described order identification information. However, the present invention is not limited thereto. In addition, in order for the payment approval information to be delivered to the vehicle, the service relay server 120 may assign an ID to a relay session between the vehicle 110 and the charging station server 130 and manage the ID so that the ID is used by the vehicle and the charging station server for each piece of relayed data, which is illustrative and the present invention is not limited thereto. For example, the service relay server 120 may identify a relay target/session by including the order information, the vehicle number, or the user ID in the relayed data.

The vehicle 110 may notify the driver through the head unit 111, etc. that payment is successful in response to reception of the payment approval information (S206). Accordingly, the driver may exit the vehicle and input an order identification number to a charger to be used by the driver (S207). If the order identification information is included in the payment approval information by the charging station server 130, when the order identification information reports that payment is successful through the head unit 111, etc., the order identification information may be output in a form that can be identified by the driver.

The charger may transmit the input order identification number to the charging station server 130 (S208), and the charging station server 130 may refer to approval details based on the order identification number and may transmit order information (for example, payment amount, charging amount, etc.) corresponding thereto to the charger (S209).

The charger receiving the order information displays the order information through a predetermined output device (for example, a display) (S210). When the driver identifies the order information and selects charging (S211), the charger delivers a selection result (for example, a charging request) to the charging station server (S212).

Accordingly, the charging station server 130 may approve a charging procedure corresponding to the selection of the driver (S213) and may transmit charging approval information to the vehicle 110 through the service relay server 120 (S214A). Here, when the charger is equipped with the charging plug locking device, the charging station server 130 may instruct the charger to release the locked state (S214B).

Meanwhile, in response to reception of the charging approval information, the vehicle 110 may open the charging port door (S215), and accordingly, may notify the driver that the charging port door is open (S216). The driver may mount the charging plug to the open charging port (S217), and the charger may detect mounting of the charging plug and start charging for the charging amount corresponding to the order information (S218).

In the embodiments described so far, the electric vehicle that may be charged with external power has been assumed. However, it is apparent to those skilled in the art that, when a fuel door can be opened and closed through electronic control, the present invention is similarly applicable to a refueling process of an internal combustion engine vehicle.

According to various embodiments of the present invention as described above, more convenient vehicle charging is possible.

In particular, in embodiments of the present invention, when the driver selects to charge at a charger based on an in-vehicle payment history, since a vehicle charging port door is automatically opened, a separate command input for opening the charging port door is unnecessary, which is convenient.

The effects obtainable in embodiments of the present invention are not limited to the above-mentioned effects, and other effects not mentioned herein may be clearly understood by those of ordinary skill in the art to which the present invention belongs from the above description.

The present invention described above may be implemented as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Accordingly, the above detailed description should not be construed as restrictive in all respects but as exemplary. The scope of the present invention should be determined by reasonable interpretation of the appended claims, and all modifications within the equivalent scope of the present invention are included in the scope of the present invention.

What is claimed is:

1. A charging control method of an electric vehicle, the charging control method comprising:
   receiving, by the electric vehicle, input of order information for a charging station, wherein the order information is input by a user through an input device of the electric vehicle;
   requesting, by the electric vehicle, payment based on the order information; and
   opening, by the electric vehicle, a charging port door when charging approval information is received by the electric vehicle in response to order identification information corresponding to the order information being input to a charger provided in the charging station.

2. The charging control method according to claim 1, wherein:
   the payment is transmitted to a charging station server communicating with the charger through a service relay server; and
   the charging approval information is delivered from the charging station server to the the electric vehicle through the service relay server.

3. The charging control method according to claim 1, wherein the order identification information comprises first information for identifying the electric vehicle or the user of the electric vehicle.

4. The charging control method according to claim 3, wherein
   the first information comprises at least one of a vehicle number of the electric vehicle or a user ID.

5. The charging control method according to claim 1, wherein opening the charging port door comprises controlling an actuator for opening and closing the charging port door.

6. The charging control method according to claim 1, wherein the order identification information comprises second information generated based on the order information.

7. The charging control method according to claim 6, wherein the second information comprises at least one of a payment number, a receipt number, or a one-time identification number.

8. A control method of a charging station server for charging an electric vehicle, the control method comprising:

identifying, by the charging station server, approval information corresponding to order identification information when the order identification information is delivered from a charger of a charging station to the charging station server;

delivering order information corresponding to the approval information to the charger; and transmitting, by the charging station server, a signal instructing that a charging port door be opened to the electric vehicle corresponding to the order identification information when there is a charging request from the charger.

9. The control method according to claim 8, wherein the signal instructing that the charging port door be opened is transmitted to the head unit of the electric vehicle through a service relay server.

10. The control method according to claim 8, wherein the order identification information comprises first information for identifying the electric vehicle or a user of the electric vehicle.

11. The control method according to claim 10, wherein the first information comprises at least one of a vehicle number of the electric vehicle or a user ID.

12. The control method according to claim 8, wherein the electric vehicle comprises:

a head unit; and the charging port door controllable to be opened or closed under control of the head unit, wherein the head unit requests payment based on the order information for the charging station when the order information is received and performs a control operation to open the charging port door when the approval information is received in response to input of the order identification information corresponding to the order information to the charger provided in the charging station.

13. The control method according to claim 8, wherein the order identification information comprises second information generated based on the order information.

14. The control method according to claim 13, wherein the second information comprises at least one of a payment number, a receipt number, or a one-time identification number.

15. A charging control method for an electric vehicle, the charging control method comprising:

receiving, by the electric vehicle, input of order information for a charging station, wherein the order information is input by a user through an input device of the electric vehicle;

receiving the order information by a charging station server corresponding to the charging station;

generating, by the charging station server, approval information based on the order information;

delivering the approval information to the electric vehicle;

inputting order identification information corresponding to the order information to a charger provided in the charging station;

identifying, by the charging station server, the approval information corresponding to the order identification information when the order identification information is inputted to the charging station server;

delivering charging approval information from the charging station server to the electric vehicle when there is a charging request from the charger; and opening, by the electric vehicle, a charging port door of the electric vehicle in response to the charging approval information.

16. The charging control method according to claim 15, further comprising:

delivering the order information from the charging station server to the charger when the approval information is identified; and displaying at least a part of the order information on the charger.

17. The charging control method according to claim 16, further comprising delivering the charging request to the charging station server when the order information is selected by the user in the charger.

18. The charging control method according to claim 15, further comprising requesting, by the charging station server, the charger to release charging plug locking when there is the charging request from the charger.

19. The charging control method according to claim 15, wherein the order identification information comprises first information for identifying the electric vehicle or the user of the electric vehicle or second information generated based on the order information.

20. The charging control method according to claim 19, wherein:

the first information comprises at least one of a vehicle number of the electric vehicle or a user ID; and the second information comprises at least one of a payment number, a receipt number, or a one-time identification number.

* * * * *